(12) United States Patent
Chaterjee et al.

(10) Patent No.: US 7,047,848 B2
(45) Date of Patent: May 23, 2006

(54) MANUFACTURE OF STEEL COMPONENTS FOR SCREW GUN CLUTCHES

(75) Inventors: Bimal Kumar Chaterjee, Jackson, TN (US); Alan Phillips, Jackson, TN (US); John Robert Kriaski, Jackson, TN (US); Daniel Paxton Wall, Humboldt, TN (US)

(73) Assignee: Portar-Cable/Delta, Jackson, TN (US)

( * ) Notice: Subject to any disclaimer, the term of this patent is extended or adjusted under 35 U.S.C. 154(b) by 17 days.

(21) Appl. No.: 10/361,609

(22) Filed: Feb. 11, 2003

(65) Prior Publication Data

US 2003/0136541 A1   Jul. 24, 2003

Related U.S. Application Data

(63) Continuation-in-part of application No. 09/923,434, filed on Aug. 8, 2001, now Pat. No. 6,665,923.

(60) Provisional application No. 60/354,943, filed on Feb. 11, 2002, provisional application No. 60/301,450, filed on Jun. 29, 2001.

(51) Int. Cl.
   B25B 23/157     (2006.01)
   B23P 11/00      (2006.01)

(52) U.S. Cl. ..................... 81/475; 29/525.11

(58) Field of Classification Search ............. 29/525.11, 29/525.01, 525, 428, 525.05; 81/467, 473, 81/474, 475, 476, 58; 192/34
   See application file for complete search history.

(56) References Cited

U.S. PATENT DOCUMENTS

| 3,901,690 A | * | 8/1975 | Philip et al. ................... 420/9 |
|---|---|---|---|
| 4,630,512 A | | 12/1986 | Durr |
| 4,655,103 A | | 4/1987 | Schreiber et al. |
| 4,739,622 A | * | 4/1988 | Smith ............................ 62/78 |
| 4,809,572 A | | 3/1989 | Sasaki |
| 4,947,714 A | | 8/1990 | Fluri |
| 5,044,233 A | | 9/1991 | Tatsu et al. |
| 5,134,909 A | | 8/1992 | Sasaki |
| 5,138,916 A | | 8/1992 | Sato et al. |
| 5,209,308 A | | 5/1993 | Sasaki |
| 5,219,375 A | * | 6/1993 | Kamata et al. ........ 29/243.526 |
| 5,271,471 A | | 12/1993 | Sasaki |
| 5,350,026 A | | 9/1994 | Markus et al. |
| 5,360,073 A | | 11/1994 | Akazawa |
| 5,372,206 A | | 12/1994 | Sasaki |
| 5,538,089 A | | 7/1996 | Sanford |
| 5,568,849 A | | 10/1996 | Sasaki et al. |
| 5,682,800 A | | 11/1997 | Jore |
| 5,709,275 A | | 1/1998 | Neumaier |
| 5,735,183 A | | 4/1998 | Sasaki et al. |
| 5,775,186 A | | 7/1998 | Rahm |
| 5,778,989 A | | 7/1998 | Neumaier |
| 5,865,076 A | | 2/1999 | Fujiyama et al. |
| 5,881,613 A | | 3/1999 | Han |
| 5,947,210 A | | 9/1999 | Sasaki et al. |

* cited by examiner

Primary Examiner—John C. Hong
(74) Attorney, Agent, or Firm—Hunton & Williams

(57) ABSTRACT

A process for manufacturing highly wear and fatigue resistant steel components for power tools includes melting and mixing together a readily available base steel and alloying elements. The molten steel is cast into near-net-shape in an investment casting process. This method is cost competitive with forming the same component from steel with fewer alloying elements. In particular, clutch plates for a drill/driver or screw gun can be formed in this manner from a steel containing relatively large amounts of nickel and chromium, such as SAE 9310 steel, or from a steel containing a relatively large total amount of molybdenum and tungsten, such as AISI M2 steel.

37 Claims, 8 Drawing Sheets

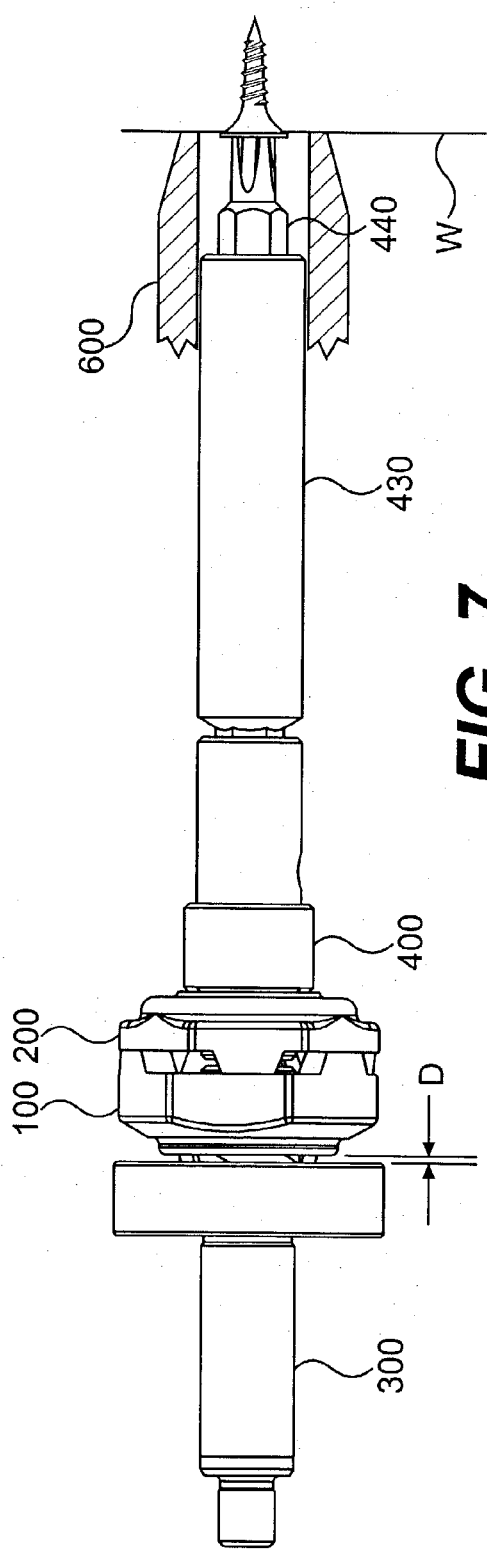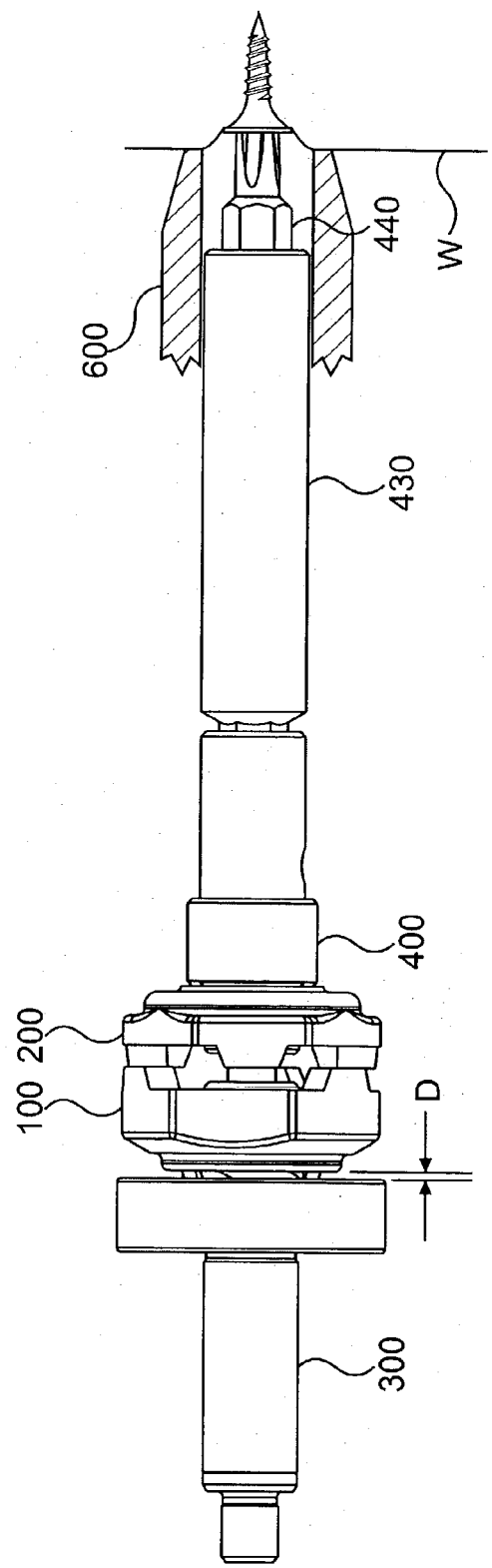

MANUFACTURE OF STEEL COMPONENTS FOR SCREW GUN CLUTCHES

This application is a continuation-in-part of U.S. patent application Ser. No. 09/923,434 filed Aug. 8, 2001 (now U.S. Pat. No. 6,665,923), which claims priority from U.S. provisional patent application No. 60/301,450 filed Jun. 29, 2001. This application also claims priority from U.S. provisional patent application No. 60/354,943 filed Feb. 11, 2002.

BACKGROUND OF THE INVENTION

The field of this invention is wear and fatigue resistant clutches for screw guns which automatically disengage when a screw is driven to a selected depth and which disengage positively to prevent clashing, and also materials and processes for manufacturing wear and fatigue resistant alloy steel components for screw gun clutches, and for power tools generally, especially hand-held power tools.

The prior art includes several examples of positive disengagement clutches, or "quiet" clutches, for screw guns. Generally, these clutches include a mechanism for moving the clutch surfaces away from one another when they disengage to prevent the clutch surfaces from clashing. This positive disengagement leads to an extended life of the clutch and results in other desirable operating characteristics such as reduced noise and vibration.

U.S. Pat. Nos. 4,655,103, 4,809,572, and 4,947,714 disclose exemplary quiet clutches for screw guns. The '714 patent discloses a clutch with three clutching elements—a drive element, an intermediate element and an output element. To drive a screw, all three clutch elements are initially engaged with one another (see FIG. 2 of the '714 patent). At some point while driving the screw, torque causes the intermediate element and the output element to separate from each other due to the cam surfaces 30, 15 (see FIG. 3 of the '714 patent). When the screw is almost driven to its intended depth, the intermediate element and the output element slide axially forward away from the input element, following the screw into the work piece (see FIG. 4 of the '714 patent). When the screw reaches its intended depth, the input element and the intermediate element slip. Once the slip occurs, the torque is released and the separation between the output element and the intermediate element caused by the torque and the cam surfaces 30 and 15 is no longer present. A spring positioned between the input element and the intermediate element returns the intermediate element back together with the output element. This return creates a gap "s" between the input element and the intermediate element (see FIG. 5 of the '714 patent). The gap prevents clashing of the clutch surfaces during disengagement.

While the clutch described in the '714 patent prevents clashing of the clutch surfaces during disengagement, the contact area between the intermediate element and the output element in the '714 patent decreases as the intermediate element moves away from the output element. This decrease in the contact area leads to an additional increase in the stress which arises on the intermediate element and the output element from the transfer of torque from one to the other. The increased stress could lead to a decrease in the fatigue life of each part.

Clutch components such as the drive element, intermediate element and output element described in the '714 patent have been made from steel such as SAE 8620 steel. While this steel has been selected because of its desirable wear and fatigue properties, clutches in screw guns nevertheless remain one of the shortest-lived wear components in these tools. Breakdown of screw guns due to clutch failure causes the user to spend considerable time and money repairing the clutch or replacing the tool in its entirety.

Screw gun clutches, as well as other high-wear components in power tools, would benefit from greater wear and fatigue resistance properties. Many high-wear components in hand-held power tools are especially sensitive to wear and fatigue because in hand-held power tools the weight and size of these components is typically minimized. Use of higher alloy steels can improve the wear and fatigue resistance of these components but does so typically at the expense of the cost competitiveness of the tool. Higher alloy steels can lead to greater initial manufacturing and inventory costs and increased difficulty in final machining.

The wear and fatigue resistance of screw gun clutches is improved herein through both improvements in the design of these clutches and improvements in the materials and manufacturing methods for producing them. These improvements are achieved with very little increase in the cost of the clutches.

Thus, one aspect of the invention is a clutch design which prevents clashing of the clutch surfaces during disengagement and is also more wear resistant than previous designs. This clutch design is also simple and inexpensive.

Another aspect of the invention is materials and methods for manufacturing the components of the clutch. The components can be cast to near-net shape with a higher alloy steel, and can later be carburized or nitrided and subjected to other treating processes. In addition to screw gun clutches, these materials and methods are also applicable to other high-wear components in power tools generally, such as clutch components for drill/drivers and rotary ratchets for hammerdrills and hammers.

BRIEF DESCRIPTION OF THE DRAWINGS

FIGS. 6–9 are side views of the clutch in FIG. 5 in various stages of engagement.

DETAILED DESCRIPTION OF THE INVENTION

The invention provides a clutch which prevents clashing of the clutch surfaces during disengagement. This clutch design is more resistant to wear and fatigue than some previous designs. The invention also provides materials and methods for manufacturing the components of the clutch. The principles of the materials and methods for manufacturing the components of the clutch are equally applicable, in a similar manner, to other high-wear components in hand-held power tools generally, and especially to high-wear components such as clutch components for drill/drivers and rotary ratchets for hammerdrills and hammers. The principles of this aspect of the invention will be explained as applied to the manufacture of clutch components for a screw gun. Those of skill in the art will recognize their application to other power tools generally.

Figure 1:
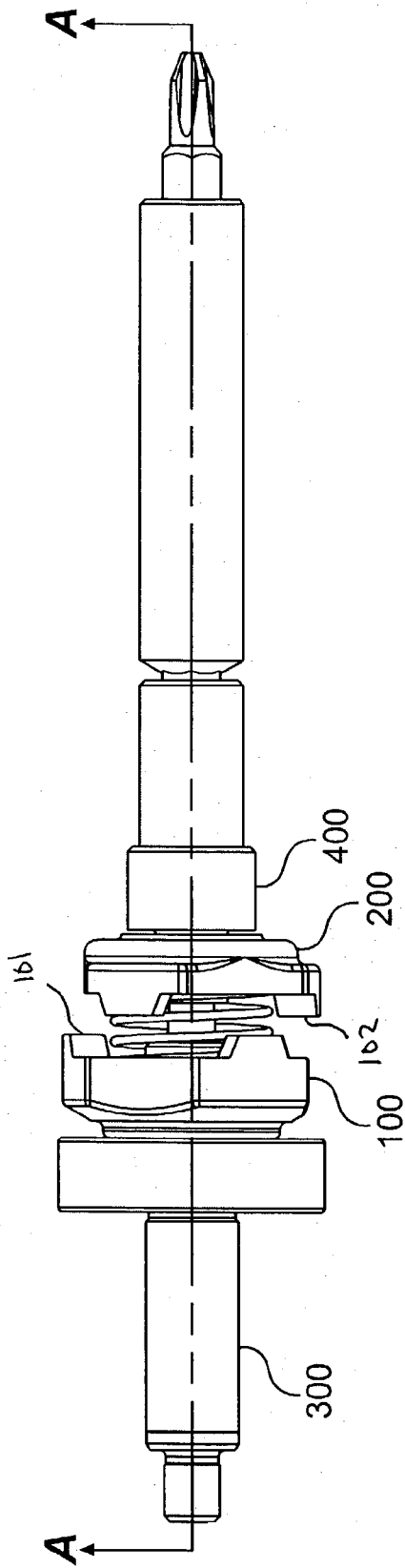
FIG. 1 is a side view of a clutch according to one embodiment of the invention.
Figure 2:
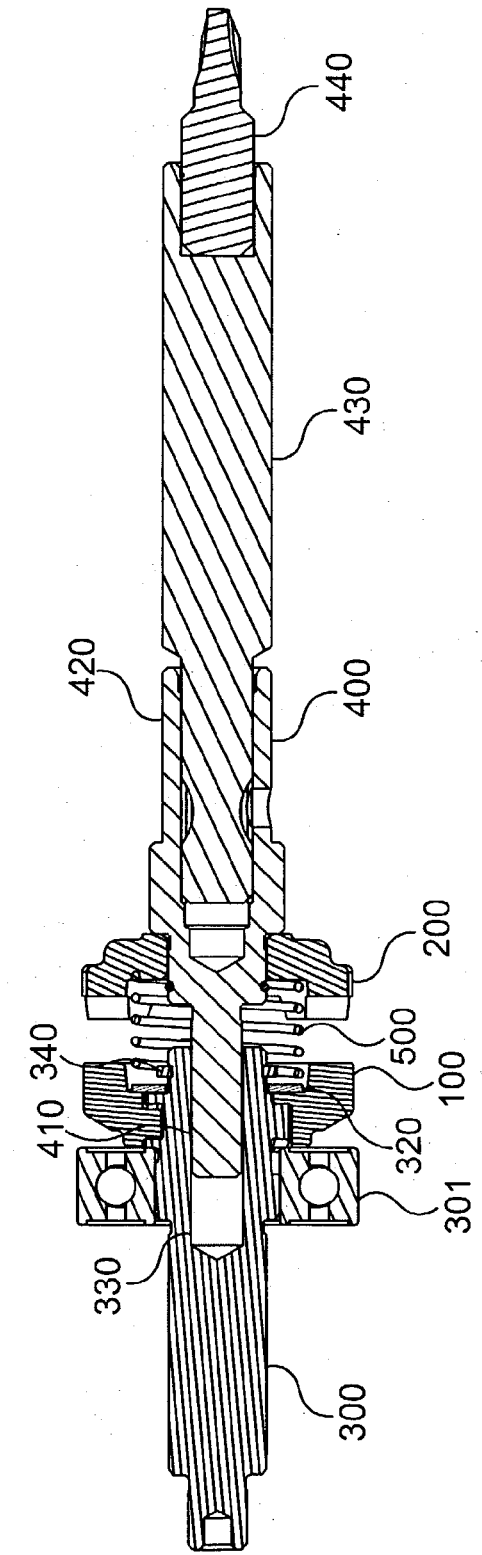
FIG. 2 is a sectional view of the clutch taken along line A—A of FIG. 1.

With reference to FIGS. 1 and 2, the clutch includes a driving clutch 100 and an output clutch 200. The driving clutch 100 and output clutch 200 are configured with mating surfaces, such as lugs 101 and 201, that, when engaged, are capable of transmitting torque from one to the other.

An input spindle 300 is driven by a driving means housed in the tool, such as an electric motor or the like. Bearing 301 supports input spindle 300 so that it can rotate relative to the tool housing. Input spindle 300 and driving clutch 100 engage one another through a helical spline assembly, as will be described in detail below.

Output spindle 400 includes an end 420 into which a bit driver 430 is detachably mounted. A bit 440 adapted for driving a screw or some other fastener is in turn detachably mounted into bit driver 430. Another end 410 of the output spindle 400 is journaled with a sliding fit inside of a bore 330 formed in the input spindle 300. The sliding fit allows output spindle 400 to rotate and freely slide axially in bore 330. The output clutch 200 is fixed to and rotates with output spindle 400. While output clutch 200 preferably does not slide axially any appreciable amount relative to the output spindle 400, it may slide axially together with output spindle 400.

A compression spring 500 biases the output clutch 200 and the output spindle 400 apart from the driving clutch 100. The respective ends of compression spring 500 push against the driving clutch 100, or an optional thrust washer 320, and the output clutch 200.

Figure 3:
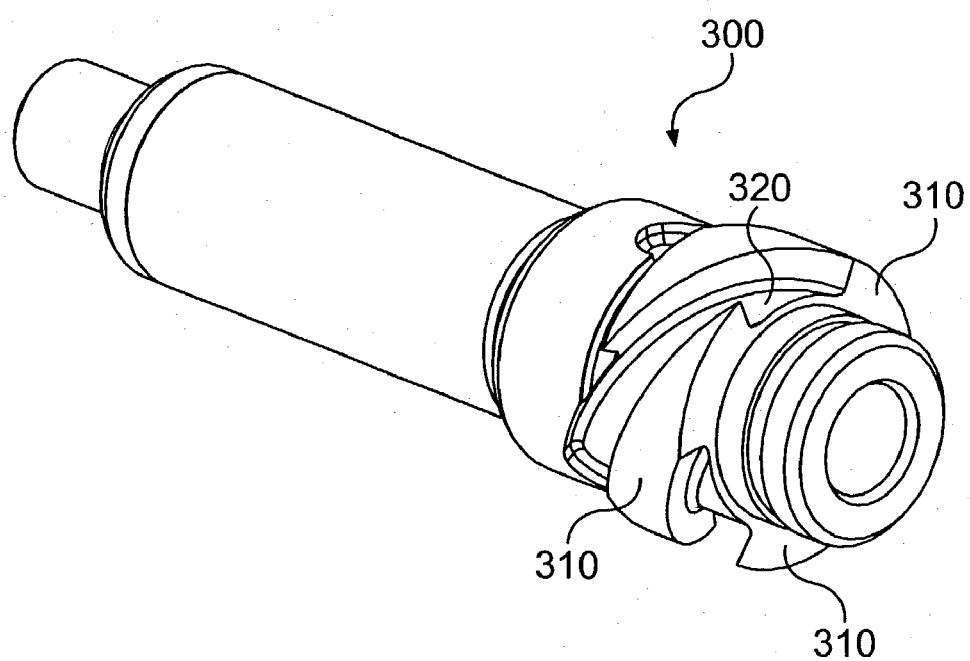
FIG. 3 is an isometric view of the input spindle for the clutch in FIG. 1.
Figure 4:
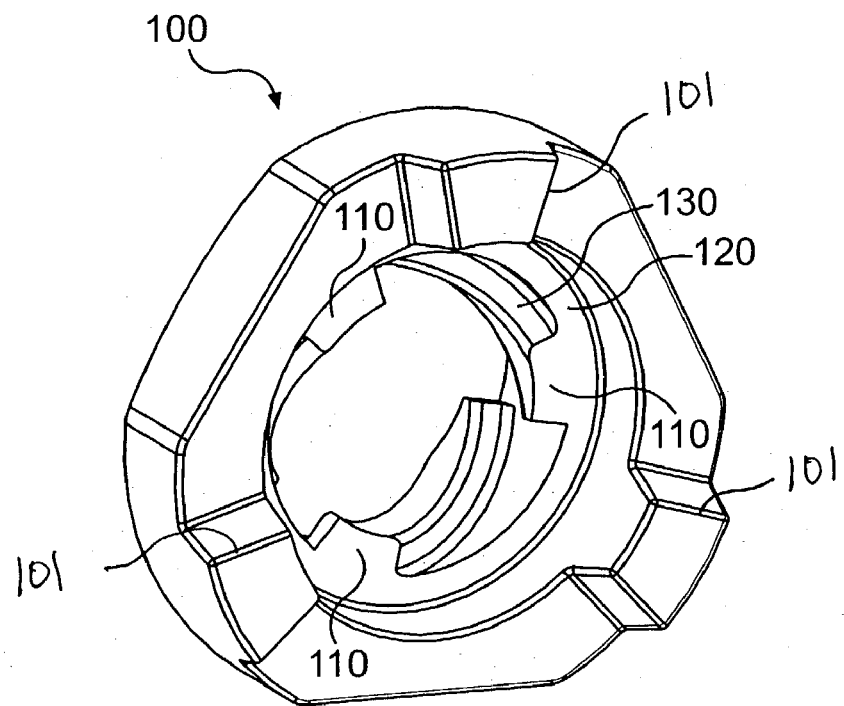
FIG. 4 is an isometric view of the driving clutch for the clutch in FIG. 1.

With reference to FIGS. 3 and 4, the input spindle 300 and the driving clutch 100 are illustrated, respectively. The input spindle 300 and the driving clutch 100 engage one another through a helical spline assembly. The driving clutch 100 has helical splines 110 formed on its interior bore 130. The input spindle 300 has corresponding helical splines 310 formed on an exterior cylindrical surface 320. The helical splines 110, 310 are sized to mesh with one another in a manner similar to the meshing of threads on a nut and bolt. When the driver is operated in the forward direction to drive a fastener, torque is transferred from the input spindle 300 to the driving clutch 100. The force at the helical splines 110, 310 caused by the torque creates an axial reaction force tending to push the driving clutch 100 axially away from the input spindle 300. When the driving clutch 100 moves axially away from the input spindle 300, the driving clutch 100 also rotates a few degrees relative to the input spindle 300. The axial movement of the driving clutch 100 relative to the input spindle 300 can be limited by a retaining ring 340 (FIG. 2) or other structure. Thrust washer 320 is optionally provided in one embodiment to ride against an annular surface 120 (FIG. 4) of the driving clutch 100 to distribute the load from the driving clutch 100 to the retaining ring 340.

Besides the illustrated helical spline assembly, the engagement between the input spindle 300 and the driving clutch 100 may be through any arrangement including complementary engaging surfaces formed on the input spindle 300 and the driving clutch 100 where the transfer of torque from one to the other causes an axial reaction force between the input spindle 300 and the driving clutch 100, and where the complementary engaging surfaces are formed on the exterior cylindrical surface 320 of the input spindle and on the interior bore 130 of the driving clutch.

Figure 12:
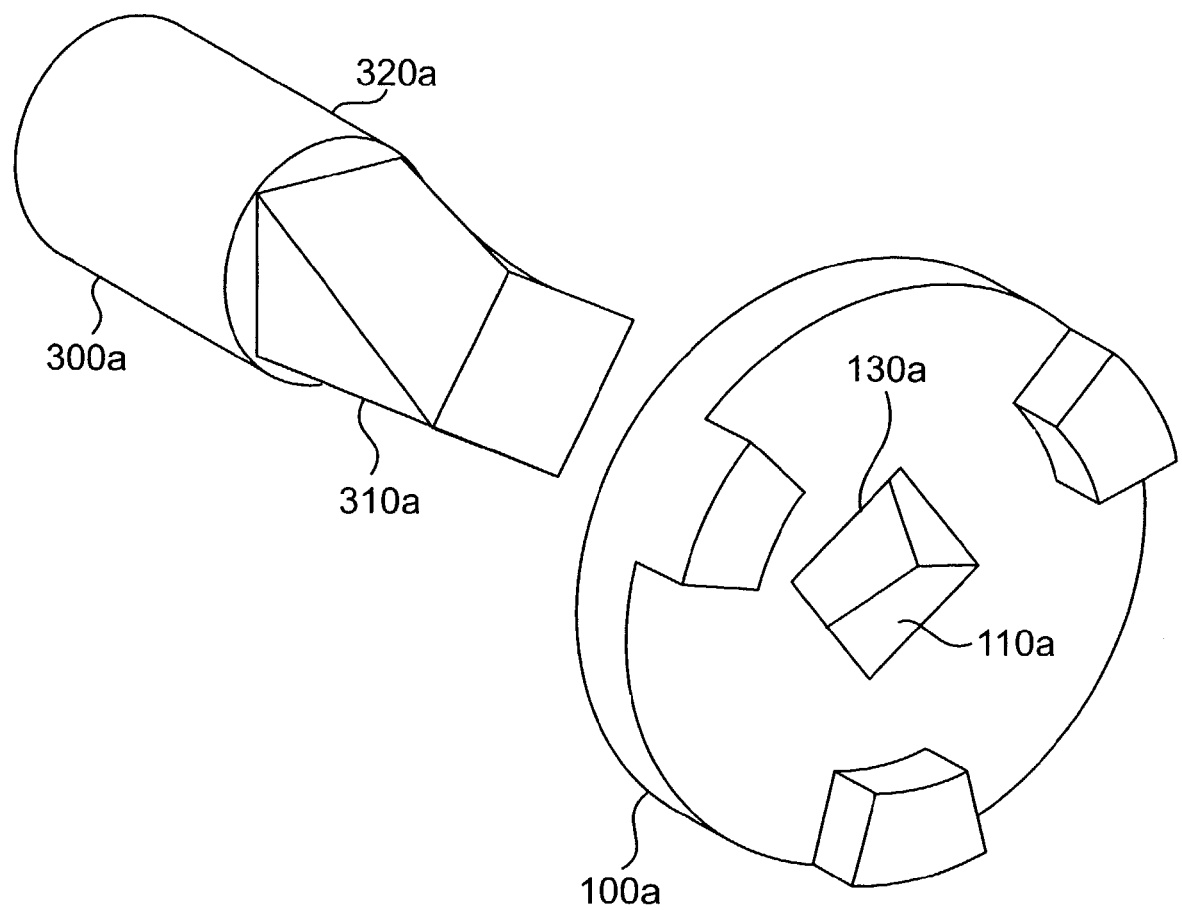
FIG. 12 is a schematic illustration of another embodiment of the input spindle and the driving clutch.

For example, FIG. 12 illustrates an alternative preferred embodiment where the input spindle 300a includes a square-sectioned, helically twisted engaging surface 310a formed on its exterior cylindrical surface 320a. The surface 310a is complementary with and engages a similarly square-sectioned, helically twisted engaging surface 110a formed on the interior bore 130a of driving clutch 100a. As with the input spindle 300 and the driving clutch 100, when the input spindle 300a transfers torque in a forward direction to the driving clutch 100a, an axial reaction force is created tending to push the driving clutch 100a away from the input spindle 300a.

One advantage of such an arrangement is that the contact area between the input spindle 300 and the driving clutch 100 remains substantially constant. Even though the driving clutch 100 moves away from the input spindle 300, the contact area does not decrease. Thus, the pressure on the contact area which arises during torque transfer does not increase due to a decrease in the contact area.

The helical splines 110 and 310 on the driving clutch 100 and the input spindle 300 can be machined. Alternatively, they may be formed in a metal injection molding, powder metal forming, or investment casting operation. The helix angle of each of the splines (measured from a plane parallel to the axis of the input spindle) is preferably between about 45° and 75°, and more preferably between about 55° and 65°, and most preferably about 60°.

Typically, the components of the clutch in a screw gun are the most prone to early failure requiring repair of the clutch or replacement of the tool in its entirety. Even with the positive disengagement of the clutch described herein—which helps greatly reduce wear and fatigue—the driving clutch 100 and the output clutch 200, and to a lesser extent the input spindle 300, remain sensitive to failures caused by wear and fatigue. It would be highly advantageous if the clutches 100 and 200 were less prone to wear and fatigue so that they would not as often require repair or replacement of the tool.

It has been found that forming the clutches 100 and 200 from a steel containing relatively large amounts of chromium and relatively large amounts of nickel as alloying elements increases the life of the clutches 100 and 200. Preferably, the steel contains more than 1% nickel by weight; more preferably the steel contains more than 1% nickel by weight and more than 0.4% chromium by weight; more preferably the steel contains more than 2% nickel by weight and more than 0.8% chromium by weight; and most preferably the steel contains more than 3% nickel by weight and more than 1% chromium by weight. For example, testing has indicated that when the clutches 100 and 200 are formed of SAE 9310 steel, which has 1–1.4% chromium and 3–3.5% nickel by weight, the clutches enjoy a longer life than past clutches.

Alternatively, it has also been found that forming the clutches 100 and 200 from a steel containing a relatively large total amount of molybdenum and tungsten as alloying elements increases the life of the clutches 100 and 200. Preferably, the total amount of molybdenum and tungsten in the steel is more than 5% by weight; more preferably the total amount of molybdenum and tungsten in the steel is more than 7% by weight; and most preferably the total amount of molybdenum and tungsten in the steel is more than 9% by weight. Preferably, this steel also contains relatively high amounts of chromium and vanadium as alloying elements in addition to the molybdenum and tungsten. For example, at least approximately 0.5% by weight vanadium and at least approximately 3% by weight chromium are preferable. For example, testing has shown that when the clutches 100 and 200 are formed of AISI M2 steel, which has a total amount of molybdenum and tungsten of approximately 11% by weight, the clutches enjoy a longer life than past clutches.

Also, it has been found that case hardening of the clutches 100 and 200 further increases their lifespan. The case hardening can be accomplished through carburizing techniques or nitriding techniques, as appropriate or desirable for the given steel.

In order to ensure a sufficient case depth on the edges of the lugs 101 and 201, the edges can be "pre-radiused" before case hardening. The edges between the top and sides of lugs 101 and 201 wear against one another during operation and are the primary wear surfaces of the lugs. In the design of the clutches 100 and 200 and the lugs 101 and 201 depicted in the figures, the clutches begin to operate roughly when the edges of the lugs have been rounded to a radius of approximately 0.065 to 0.075 inches. If the case hardening is performed while the edges of the lugs 101 and 201 are sharp, then the hardened case on the edges may still be quickly worn away as the sharp corners are rounded by wear. To avoid having the hardened case worn away too quickly at the critical edges of the lugs 101 and 201, those edges may be pre-radiused up to an approximate radius of about 0.030 to about 0.035 inches. The case hardening is then performed after this pre-radiusing so that the case depth extends a uniform depth below the pre-radiused surface, and further into the clutches than it does if the case hardening is performed while the edges are sharp. This technique is very effective in maintaining a case hardened surface on the edges of the lugs for a greater portion of the clutch's life.

In the case of using nitriding as a case hardening technique, the pre-radiusing may be necessary to ensure that the edges of the lugs 101 and 201 do not become too brittle and chip during use of the screw gun.

In addition to case hardening, the clutches can be treated with heat treatment processes, including cryogenic treatments.

EXAMPLES

Tests were conducted to compare screw gun clutches made from a steel with relatively large amounts of chromium and nickel to screw gun clutches marketed by a competitor. Each of the screw guns in this test operated at a speed of approximately 5,000 r.p.m. and was used to drive 1⅝ inch long screws into a test material. The competitor's screw gun utilized a clutch with lugs similar to those depicted on clutches 100 and 200 herein. The clutches in the competitor's screw gun are made from SAE 8620 steel. The competitor's screw gun drove approximately 6,000 screws when it was judged to be operating roughly because the clutch was chattering.

A screw gun built by the assignee of this invention was also used at approximately 5,000 r.p.m. to drive 1⅝ inch long screws into the test material. This screw gun utilized a clutch with the helical spline design depicted in the drawings herein and which was made from a steel with relatively large amounts of chromium and nickel—in this case SAE 9310 steel. The clutch was also case hardened through a carburizing technique with an effective case depth of 0.040 to 0.050 inches to a hardness of 62–65 Rockwell C, and was subjected to a cryogenic treatment after the carburizing. This screw gun drove 15,000 screws before it was judged to be operating roughly because of clutch chatter.

In order to further enhance this performance, a test was made with an identical screw gun except in this case the lugs on the clutches were pre-radiused to a radius of approximately 0.035 inches before the carburizing treatment. With the pre-radiused clutch, the screw gun drove 30,000 screws before it was judged to be operating roughly because of clutch chatter. Thus, it can be seen that the pre-radiusing of the clutch before carburizing resulted in a much longer life for the clutch.

A further test was conducted with a screw gun built by the assignee of this invention and operated at approximately 5,000 r.p.m. to drive 1⅝ inch long screws into the test material. This screw gun utilized a clutch with the helical spline design depicted in the drawings herein and which was made from a steel with a relatively large total amount of molybdenum and nickel—in this case AISI M2 steel. This screw gun drove 30,000 screws and was still judged to be running smoothly before the test was stopped. An identical screw gun, except that the edges on the lugs 101 and 201 were pre-radiused to a radius of about 0.030 to 0.035 inches and the clutches were nitrided in a salt bath, was put through the same test. This screw gun drove 35,000 screws and was still judged to be running smoothly before the test was stopped.

A summary of these test results is displayed in the chart below.

| | Competitor's Screw Gun | |
|---|---|---|
| Steel | | No. of Cycles |
| SAE 8620 | | 6,000 |
| | Test Screw Guns | |
| Steel | Pre-Radiused | Case Hardened | No. of Cycles |
| SAE 9310 | No | Yes | 15,000 |
| SAE 9310 | Yes | Yes | 30,000 |
| AISI M2 | No | No | >30,000 |
| AISI M2 | Yes | Yes | >35,000 |

Several drawbacks can arise from using a steel with large amounts of alloying elements to form components in a screw gun clutch. The presence of alloying elements in the steel can render it very difficult to machine. A decrease in machinability will contribute to an overall increase in the cost of the part.

Also, steel with large amounts of alloying elements can typically only be ordered from a mill at a competitive price in relatively large quantities. The large quantity is necessary because these steels are often not widely used and therefore not routinely made by steel mills. Such a large quantity order of steel will result in large inventories of the steel to be held by the manufacturer. Such a large inventory can be particularly burdensome when only very small parts are to be formed, such as clutch components for a screw gun. The cost of purchasing so far in advance and keeping such a large inventory of a raw material is a major drawback.

Normally these drawbacks of decreased machinability and large inventories would necessitate against the use of a specialized steel for small parts such as screw gun clutch components where costs need to be tightly controlled.

However, it has been found that these and other drawbacks of using a specialized steel for small, high-wear components can be overcome by using a near-net-shape investment casting process. The investment casting process can use a more widely available base steel as a raw material. The base steel can be melted and combined with additional alloying elements with the final chemistry of the steel being controlled by the investment caster. This eliminates the drawback of large inventories of a specialized steel. For example, SAE 1010 steel, a widely available and relatively inexpensive steel, can be used as the base steel. Alloying elements can be combined with the molten SAE 1010 steel to result in molten steel with the same chemistry as SAE 9310 steel.

Also, because of the relatively low tooling costs, parts can be investment cast in short runs of low quantities because there is little cost advantage to large runs. The small quantities of the short runs result in small inventories of the finished part, further reducing the inventory costs.

The investment casting operation can also be selected to produce components with acceptable final dimensions and tolerances so that further machining is unnecessary. This type of investment casting is referred to as near-net-shape. While near-net-shape investment casting is relatively expensive, it has been found that cost savings gained from eliminating most final machining steps help to keep the cost of this process competitive. In fact, it has been found that the driving clutch 100 and the output clutch 200 can each be formed of SAE 9310 steel in a near-net-shape investment casting operation for about 91 cents each, which compares very well to the cost of about 89 cents for producing the same parts with SAE 8620 steel. Thus, for a very small increase in cost, the clutches 100 and 200 can be made to heavily outperform clutches that have been used in the past Operation Two modes of operation of the clutch depicted in FIGS. 1–9 will now be described.

Figure 5:
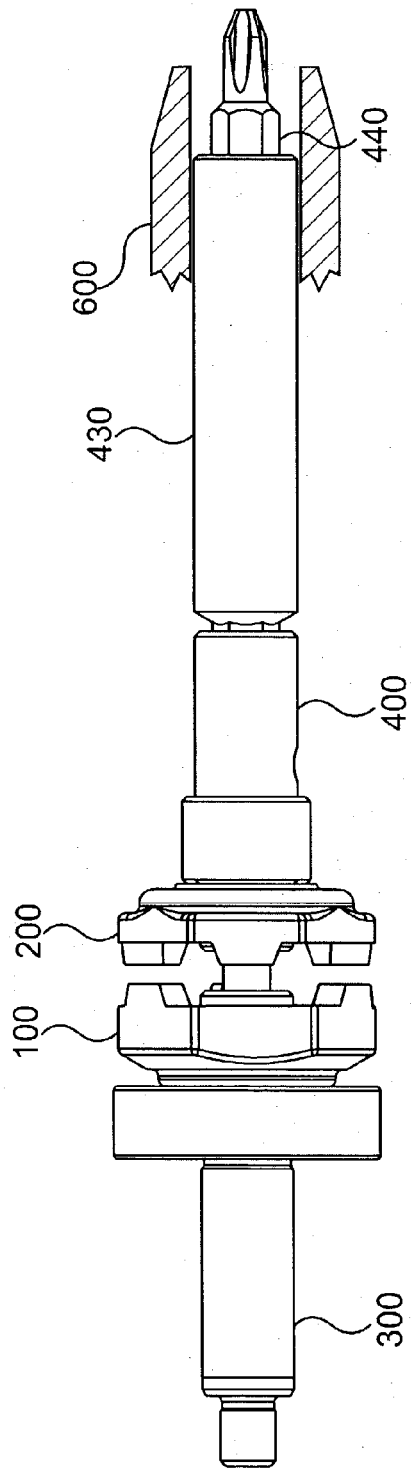
FIG. 5 is a side view of the clutch in FIG. 1 together with a sectional portion of a nosepiece for use with the clutch.

In the first mode of operation, FIG. 5 depicts the clutch in a disengaged state, and it will be assumed that the drive means of the tool is not yet activated.

Figure 6:
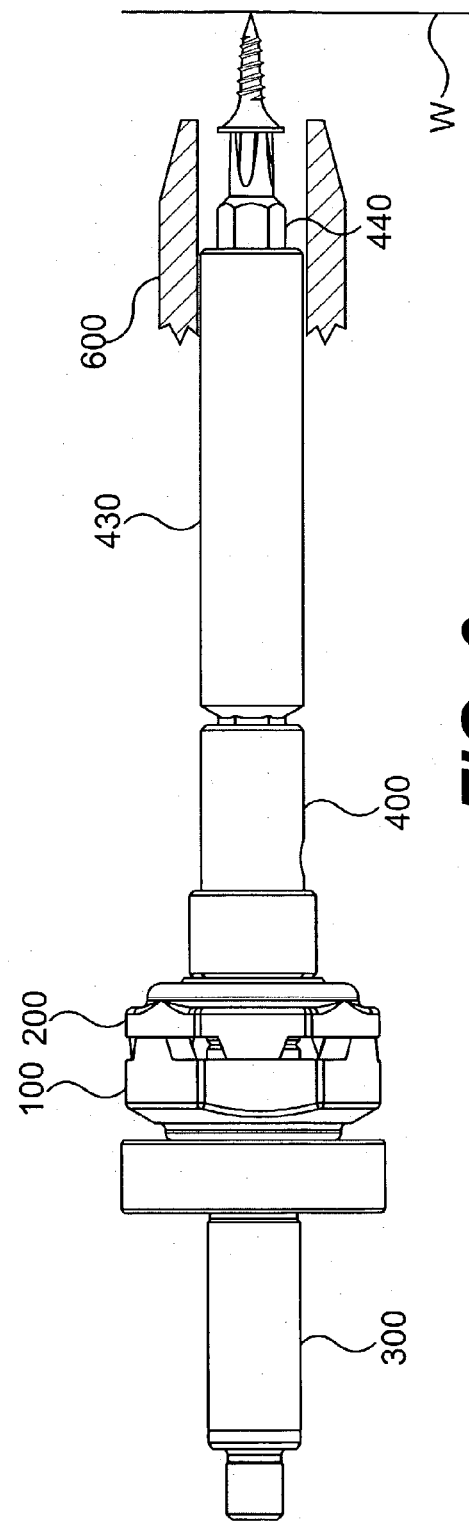

In FIG. 6, the user pushes the bit 440 and a screw or other fastener against a work piece W. This pushing force is transferred from the screw gun to the input spindle 300, to the driving clutch 100, to the thrust washer 320 and spring 500. This pushing force is also transferred from the spring 500 to the output clutch 200, output spindle 400, bit holder 430, bit 440 and finally to the screw. The pushing force compresses spring 500, causing output spindle 400 and output clutch 200 to slide axially closer to the driving clutch 100 and input spindle 300. Eventually, when the pushing force is great enough, the driving clutch 100 and the output clutch 200 begin to engage. When the driving clutch 100 and output clutch 200 begin to engage, they are ready to transfer torque. When the driving clutch 100 and the output clutch 200 are fully engaged, the pushing force is directly transferred between them.

When the driving means is activated, torque is applied to the input spindle 300 and in turn is transferred to the driving clutch 100, the output clutch 200, the output spindle 400, the bit holder 430, the bit 440 and finally to the screw, rotating each of these components together. The screw is thereby driven into the work piece W.

In FIG. 7, at some point while driving the screw, the torque transferred through the input spindle 300 and driving clutch 100 becomes great enough that the reaction force resulting from the torque on the helical splines 310, 110 causes driving clutch 100 to rotate slightly relative to the input spindle 300 and move axially away from the input spindle 300 by a small distance D, until the driving clutch 100 and the thrust washer 320 (FIG. 2) abut retaining ring 340 (FIG. 2). This movement of the driving clutch 100 also causes the output clutch 200, output spindle 400, bit holder 430 and bit 440 to slide axially forward a small amount.

Eventually the screw is driven to a predetermined depth and an end of the nosepiece 600 abuts the work piece W, as depicted in FIGS. 7 and 8. The user's pushing force against the screw gun is then transferred through the nosepiece 600 to the work piece W, and no longer through the clutch. With the user's pushing force no longer fully compressing spring 500, the output spindle 400 and the output clutch 200 are pushed axially away from the driving clutch 100 and input spindle 300 as the screw is driven further into the work piece W. In one embodiment, the output spindle 400 and the output clutch 200 are pushed axially away from the driving clutch 100 and input spindle 300 by a reaction force created at the surface of sloped mating teeth formed on the mating surfaces of each of the output clutch 200 and driving clutch 100. As output clutch 200 moves axially away from the driving clutch 100, it begins to disengage from driving clutch 100, as depicted in FIG. 8.

Figure 9:
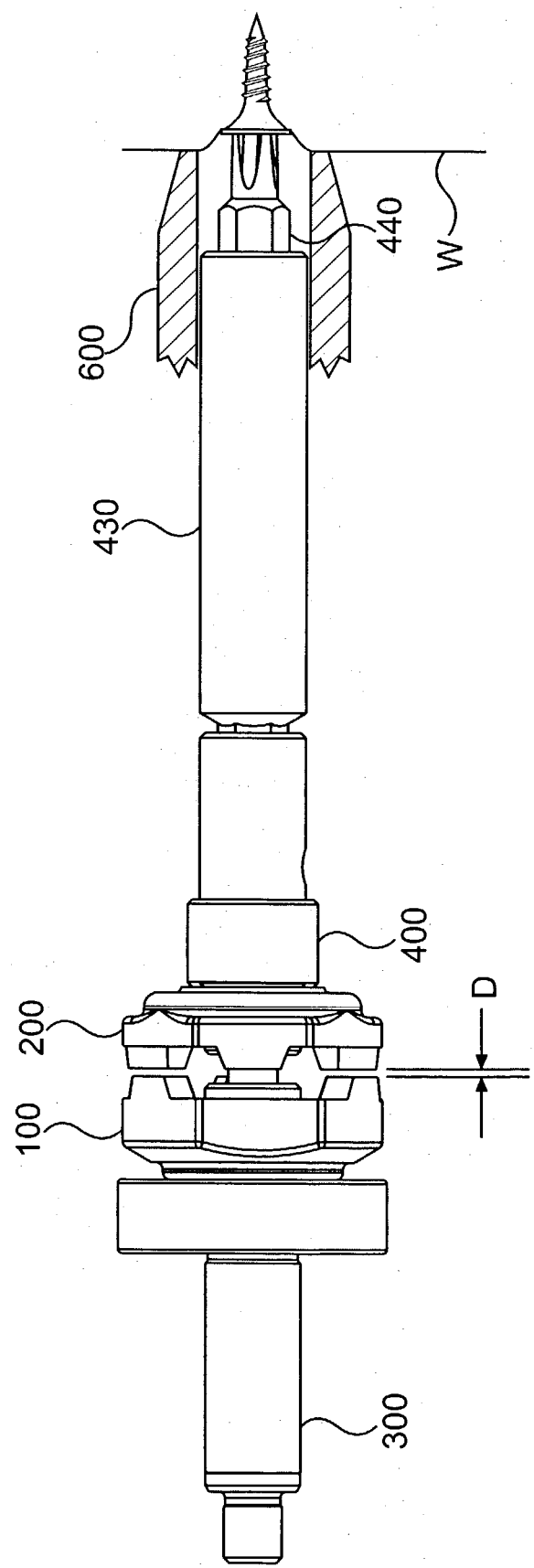

Eventually, the mating surfaces of output clutch 200 move just beyond the mating surfaces of driving clutch 100 and they slip and disengage. At the instant they slip, the torque transmitted from the input spindle 300 to the driving clutch 100 is released. When the torque is released, the reaction force from the helical splines 110, 310 which pushes the driving clutch 100 axially away from the input spindle 300 is also released. Once this reaction force is released, spring 500 pushes the thrust washer 320 and the driving clutch 100 back into their original positions relative to input spindle 300 so that there is no longer a distance D separating them. This motion also moves driving clutch 100 axially away from the output clutch 200, creating a new clearance distance D between the two output clutch 200 and the driving clutch 100, as depicted in FIG. 9. This clearance distance D ensures a clean disengagement of the clutch and reduces clashing.

In the second mode of operation, FIG. 5 depicts the clutch in a disengaged state, and it will be assumed that the drive means of the tool is already activated. This mode of operation is commonly employed by tradesmen who lock the screw gun in its "ON" position during continuous use for driving one fastener after another in rapid succession.

When the user pushes a screw against a work piece W with the screw gun, as in FIG. 6, output clutch 200 moves toward engagement with driving clutch 100, as in the first mode. Since the drive means is already activated, input spindle 300 and driving clutch 100 are already rotating. As soon as driving clutch 100 and output clutch 200 begin to engage, output clutch 200 and output spindle 400 immediately begin to rotate along with driving clutch 100 and input spindle 300 and the screw is driven into work piece W.

As in the first mode, at some point while driving the screw, the torque transferred through the input spindle 300 and driving clutch 100 becomes great enough that the reaction force resulting from the torque on the helical splines 310, 110 causes driving clutch 100 to move away from input spindle 300 by a small distance D, as depicted in FIG. 7. From this point forward, the clutch will continue to operate as described in the first mode until the clutch disengages.

Besides simplicity, this design includes other advantages not present in the prior art. For example, the retaining ring 340, shown in FIG. 2, is advantageously placed on the input spindle 300 so that at the time when the driving clutch 100 and thrust washer 320 contact retaining ring 340, the retaining ring 340 rotates at the same speed as driving clutch 100. In the design disclosed in U.S. Pat. No. 5,538,089, an annular projecting shoulder 88 (see FIG. 1 of the '089 patent) is formed in the clutch housing and bears against annular shoulder 56 on the intermediate clutch. The projecting shoulder 88 stops the forward axial movement of the intermediate clutch, but also causes friction as the clutch housing does not rotate and the intermediate clutch rotates at a high speed. The disclosure suggests that a journal bearing 89 can be placed between the projecting shoulders 88 and 56, but heat and wear are nevertheless created by the friction resulting from the contact. Retaining ring 340 disclosed herein produces substantially no heat or wear.

Retaining ring 340 must be able to withstand the axial force placed upon it by the driving clutch 100. To this end, two alternative embodiments are proposed in FIGS. 10–11 which may provide an increased fatigue life for the clutch.

Figure 10A:
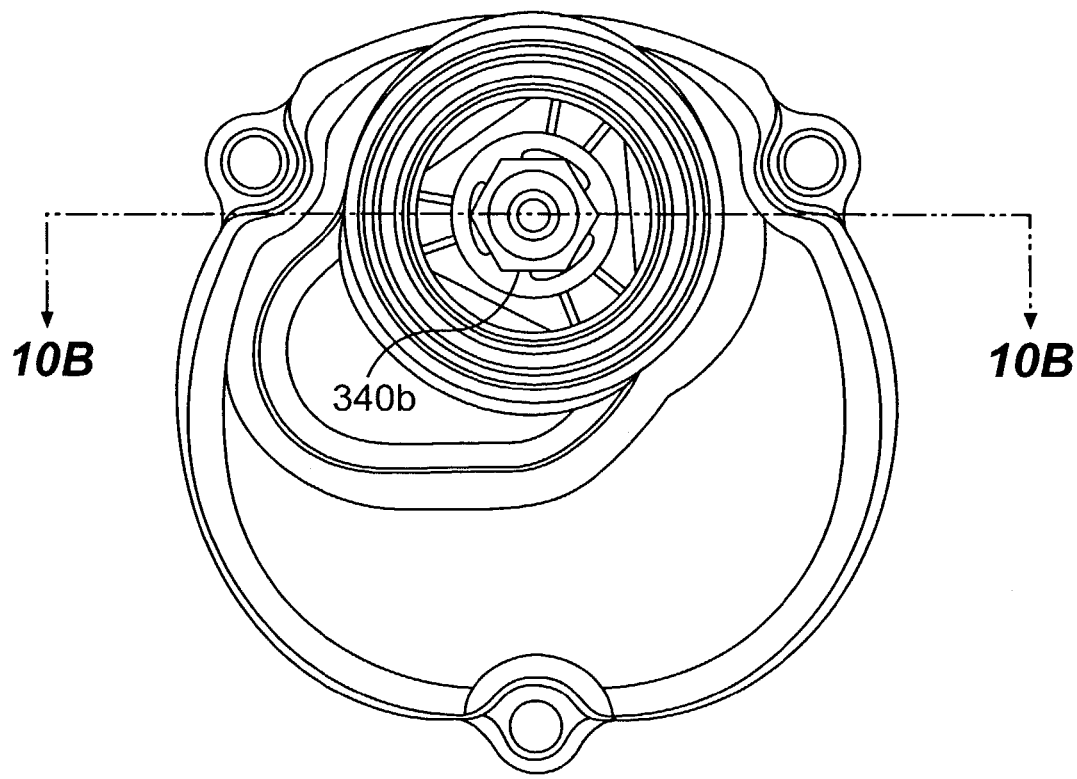
FIGS. 10A–10B are views of an embodiment of the clutch including a first alternative to the retaining ring in FIG. 1.
Figure 10B:
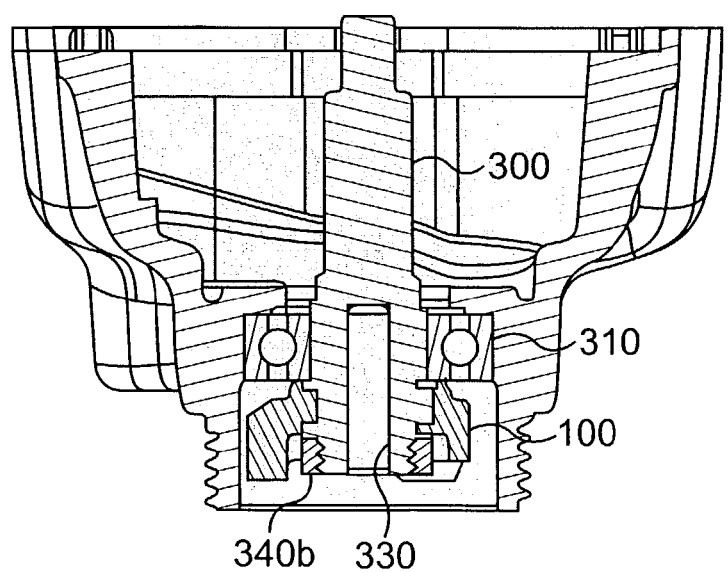

FIGS. 10A–10B illustrate a preferred embodiment which includes a first alternative to retaining ring 340: a nut 340b. Nut 340b is threaded on its inside diameter. The outside diameter of the input spindle 300 has complementary threads in this embodiment so that nut 340b is held onto input spindle 300 with a threaded connection. The threaded connection provides additional strength to keep nut 340b securely positioned on the input spindle 300 during the life of the tool.

Figure 11B:
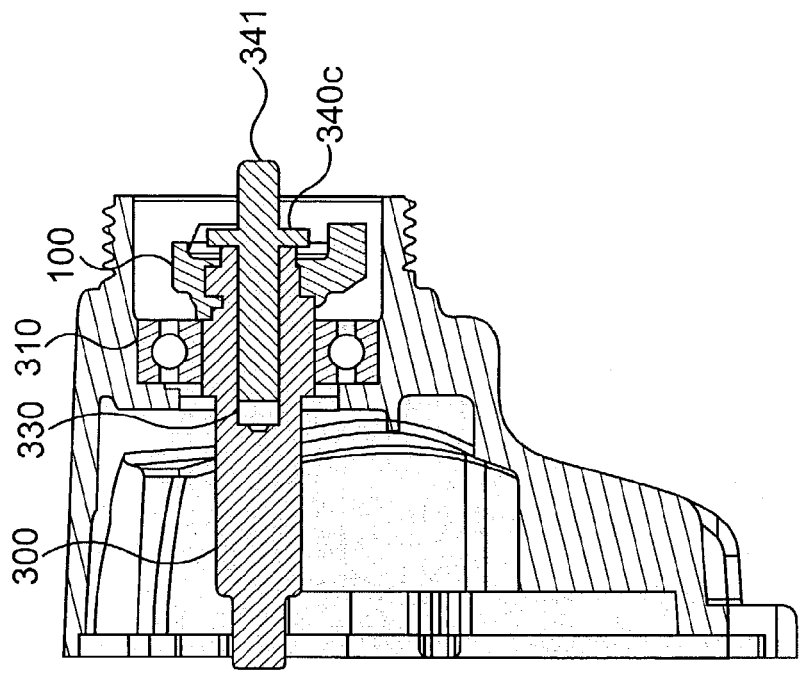
FIGS. 11A–11B are views of an embodiment of the clutch including a second alternative to the retaining ring in FIG. 1.
Figure 11A:
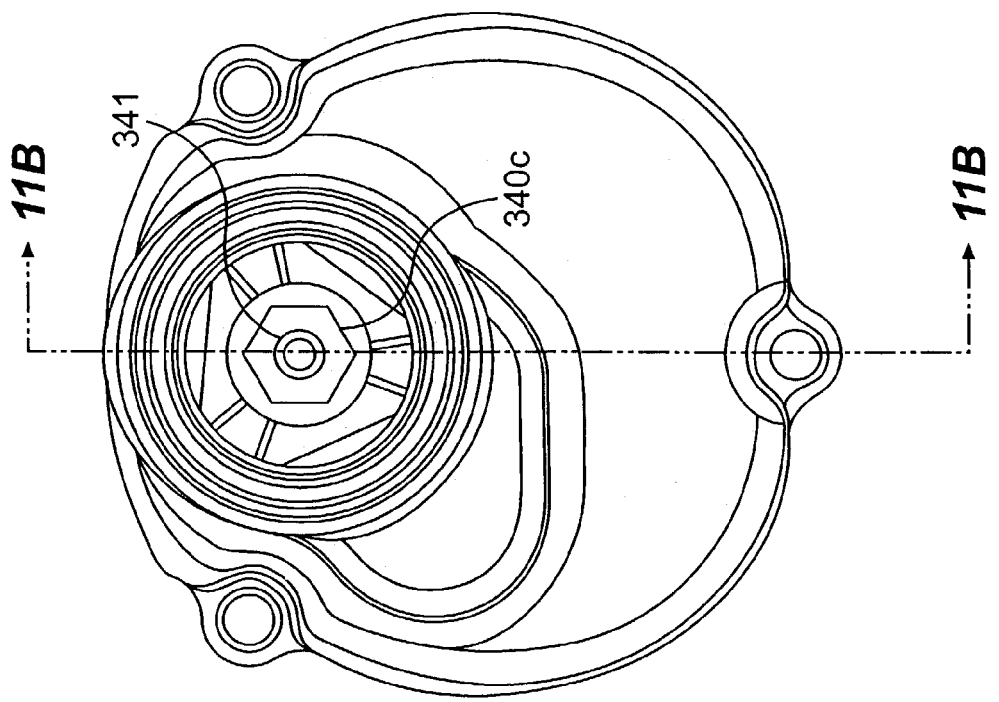

FIGS. 11A–11B illustrate a preferred embodiment which includes a second alternative to retaining ring 340: a flange 340c on a stud 341. One end of stud 341 is sized to fit inside of bore 330 of input spindle 300. Bore 330 has threads formed therein and one end of stud 341 has complementary threads which engage the threads of bore 330 to form a threaded connection between input spindle 300 and stud 341. Flange 340c is formed as an annular shoulder on the other end of stud 341 opposite the threaded end. In this embodiment, output spindle 400 would be formed with a bore in one end sized so that stud 341 can be journaled in the bore and the output spindle 400 can be rotationally supported by stud 341.

Although the invention has been described in relation to certain preferred embodiments, the invention is not limited to these embodiments. Many possible variations of the clutch may be realized without departing from the scope of the invention. For example, in lieu of the helical spline arrangement between the input spindle 300 and the driving clutch 100, the output clutch 200 may be connected to the output spindle 400 through a helical spline. Such an arrangement would be essentially a reversal of the arrangement illustrated in FIG. 2. Other alternatives are within the scope of the preferred embodiments and shall be regarded as equivalents. Likewise, the material and process for manufacturing the clutch components, and for manufacturing high-wear components for power tools generally, have been described in relation to a specific application. This aspect of the invention should not be limited to this single application. The principles of the material and process for producing high-wear parts in power tools generally encompass the various alternatives which will be apparent to those of skill in the art.

We claim:

1. A screw gun comprising:
an input spindle;
a driving clutch mounted to the input spindle such that when torque is transferred between the input spindle and the driving clutch a reaction force is created urging the driving clutch away from the input spindle;
an output clutch and an output spindle each mounted coaxially with the input spindle, the output clutch being axially moveable to engage the driving clutch and transfer torque between the driving clutch and the output clutch;
a bit mounted to the output spindle for driving a fastener into a work piece;
wherein at least one of the driving clutch and the output clutch is substantially formed of an alloyed steel containing at least 1% nickel by weight; and
wherein a helical spline positioned between the input shaft and the driving clutch causes the reaction force.

2. A screw gun comprising:
a rotary motor;
an output spindle adapted to drive a threaded fastener, the output spindle being driven by the rotary motor wherein the driving of the output spindle by the rotary motor ceases through disengagement of a clutch when the fastener is driven to a predetermined depth; and
a first clutch component that engages with a second clutch component to transfer torque from the rotary motor to the output spindle, the first clutch component being at least partially made from a steel alloy having at least a total combined amount of molybdenum and tungsten of 5% by weight.
wherein the first clutch component is made from a process comprising:
forming a radius of between 0.010 and 0.060 inches on at least one edge of at least one wear surface of the first clutch component; and
case hardening the first clutch component after the radius is formed.

3. The screw gun according to claim 2 wherein the radius is between 0.025 and 0.040 inches.

4. The screw gun according to claim 3 wherein the process further comprises a cryogenic treatment.

5. The screw gun according to claim 3 wherein the radius is between 0.030 and 0.035 inches.

6. The screw gun according to claim 3 wherein the process further comprises:
forming a radius of between 0.015 and 0.060 inches on at least one edge of at least one wear surface of the second clutch component; and
case hardening the second clutch component after the radius is formed.

7. The screw gun according to claim 6 wherein the radius is between 0.025 and 0.040 inches.

8. The screw gun according to claim 7 wherein the process further comprises a cryogenic treatment.

9. The screw gun according to claim 7 wherein the radius is between 0.030 and 0.035 inches.

10. The screw gun according to claim 2 wherein:
the first clutch component is at least partially made from steel alloy having at least a total combined amount of molybdenum and tungsten of 9% by weight, at least 0.5% vanadium by weight, and at least 3% chromium by weight;
wherein the first clutch component is made from a process comprising:
providing a quantity of previously manufacture base steel;
providing a quantity of alloying elements to be added to the base steel;
combining and melting the base steel and alloying in elements; and casting the molten mixture of base steel and alloying elements to form the first clutch component; and wherein the process further comprises:

forming a radius of between 0.020 and 0.040 inches on at least one edge of at least one wear surface of the first clutch component; and case hardening the first clutch component after the radius is formed.

11. A screw gun comprising:

a rotary motor;

an output spindle adapted to drive a threaded fastener, the output spindle being driven by the rotary motor wherein the driving of the output spindle by the rotary motor ceases through disengagement of a clutch when the fastener is driven to a predetermined depth; and a first clutch component that engages with a second clutch component to transfer torque from the rotary motor to the output spindle, the first clutch component being at least partially made from a steel alloy having at least a total combined amount of molybdenum and tungsten of 5% by weight, wherein the first clutch component is made from a process comprising:

providing a quantity of previously manufactured base steel;

providing a quantity of alloying elements to be added to the base steel;

combining and melting the base steel and alloying elements; and casting the molten mixture of base steel and alloying elements to form the first clutch component; and wherein:

the first clutch component comprises a plurality of lugs which project from a surface of the first clutch component and engage the second clutch component; and the process of casting the molten mixture of base steel and alloying elements to form the first clutch component further comprises casting the molten mixture of base steel and alloying elements in a near-net-shape investment casting process whereby substantially no further machining of the plurality of lugs is performed.

12. The screw gun according to claim 11 wherein the process further comprises:

forming a radius of between 0.015 and 0.060 inches on at least one edge of at least one wear surface of the first clutch component; and case hardening the first clutch component after the radius is formed.

13. The screw gun according to claim 11 wherein the radius is between 0.025 and 0.040 inches.

14. The screw gun according to claim 11 wherein the radius is between 0.030 and 0.035 inches.

15. A screw gun comprising:

a rotary motor;

an output spindle adapted to drive a threaded fastener, the output spindle being driven by the rotary motor wherein the driving of the output spindle by the rotary motor ceases through disengagement of a clutch when the fastener is driven to a predetermined depth; and a first clutch component that engages with a second clutch component to transfer torque from the rotary motor to the output spindle, the first clutch component is at least partially made from a steel alloy having at least a total combined amount of molybdenum and tungsten of 9% by weight, at least 0.5% vanadium by weight, and at least 3% chromium by weight;

wherein the first clutch component is made from a process comprising:

providing a quantity of previously manufactured base steel;

providing a quantity of alloying elements to be added to the base steel;

combining and melting the base steel and alloying elements; and casting the molten mixture of base steel and alloying elements to form the first clutch component; and wherein:

the first clutch component comprises a plurality of lugs which project from a surface of the first clutch component and engage the second clutch component; and the process of casting the molten mixture of base steel and alloying elements to form the first clutch component further comprises casting the molten mixture of base steel and alloying elements in a near-net-shape investment casting process whereby no further machining of the plurality of lugs is performed.

16. The screw gun according to claim 15 wherein the process further comprises:

forming a radius of between 0.020 and 0.040 inches on at least one edge of at least one wear surface on each of the plurality of lugs; and case hardening the first clutch component after the radius is formed.

17. A screw gun comprising:

a rotary motor;

an output spindle adapted to drive a threaded fastener, the output spindle being driven by the rotary motor wherein the driving of the output spindle by the rotary motor ceases through disengagement of a clutch when the fastener is driven to a predetermined depth; and a first clutch component that engages with a second clutch component to transfer torque from the rotary motor to the output spindle, the first clutch component being at least partially made from a steel alloy having at least 1% nickel by weight and at least 0.4% chromium by weight;

wherein the first clutch component is made from a process comprising:

forming a radius of between 0.010 and 0.060 inches on at least one edge of at least one wear surface of the first clutch component; and case hardening the first clutch component after the radius is formed.

18. The screw gun according to claim 17 wherein the radius is between 0.025 and 0.040 inches.

19. The screw gun according to claim 18 wherein the process further comprises a cryogenic treatment.

20. The screw gun according to claim 18 wherein the radius is between 0.030 and 0.035 inches.

21. The screw gun according to claim 18 wherein the process further comprises:

forming a radius of between 0.015 and 0.060 inches on at least one edge of at least one wear surface of the second clutch component; and case hardening the second clutch component after the radius is formed.

22. The screw gun according to claim 21 wherein the radius is between 0.025 and 0.040 inches.

23. The screw gun according to claim 22 wherein the process further comprises a cryogenic treatment.

24. The screw gun according to claim 22 wherein the radius is between 0.030 and 0.035 inches.

25. A screw gun comprising:
a rotary motor;
an output spindle adapted to drive a threaded fastener, the output spindle being driven by the rotary motor wherein the driving of the output spindle by the rotary motor ceases through disengagement of a clutch when the fastener is driven to a predetermined depth; and
a first clutch component that engages with a second clutch component to transfer torque from the rotary motor wherein the driving of the output spindle, the first clutch component being at least partially made from a steel alloy having at least 1% nickel by weight and at least 0.4% chromium by weight;
wherein the first clutch component is made from a process comprising:
　providing a quantity of previously manufactured base steel;
　providing a quantity of alloying elements to be added to the base steel to form a highly alloyed grade of steel;
　combining and melting the base steel and alloying elements; and
　casting the molten mixture of base steel and alloying elements to form the first clutch component; and wherein:
the first clutch component comprises a plurality of lugs which project from a surface of the first clutch component and engage the second clutch component; and
the process of casting the molten mixture of base steel and alloying elements to form the first clutch component further comprises casting the molten mixture of base steel and alloying elements in a near-net-shape investment casting process whereby no further machining of the plurality of lugs is performed.

26. The screw gun according to claim 25 wherein the process further comprises:
　forming a radius of between 0.015 and 0.060 inches on at least one edge of at least one wear surface of the first clutch component; and
　case hardening the first clutch component after the radius is formed.

27. The screw gun according to claim 25 wherein the radius is between 0.025 and 0.040 inches.

28. The screw gun according to claim 25 wherein the radius is between 0.030 and 0.035 inches.

29. A screw gun comprising:
a rotary motor;
an output spindle adapted to drive a threaded fastener, the output spindle being driven by the rotary motor wherein the driving of the output spindle by the rotary motor ceases through disengagement of a clutch when a fastener is driven to a predetermined depth; and
a first clutch component that engages with a second clutch component to transfer torque from the rotary motor to the output spindle, the first clutch component being at least partially made from a steel alloy having at least 1% nickel by weight and at least 0.4% chromium by weight;
wherein the first clutch component is made from a process comprising:
　providing a quantity of previously manufactured base steel;
　providing a quantity of alloying elements to be added to the base steel to form a highly alloyed grade of steel;
　combining and melting the base steel and alloying elements; and
　casting the molten mixture of base steel and alloying elements to form the first clutch component;
　forming a radius of between 0.020 and 0.040 inches on at least one edge of at least one wear surface of the first clutch component; and
　case hardening the first clutch component after the radius is formed.

30. A screw gun comprising:
a rotary motor;
an output spindle adapted to drive a threaded fastener, the output spindle being driven by the rotary motor wherein the driving of the output spindle by the rotary motor ceases through disengagement of a clutch when the fastener is driven to a predetermined depth; and
a first clutch component that engages with a second clutch component to transfer torque from the rotary motor to the output spindle, the first clutch component being at least partially made from a steel alloy having at least 3% nickel by weight and at least 1% chromium by weight;
wherein the first clutch component is made from a process comprising:
　providing a quantity of previously manufactured base steel;
　providing a quantity of alloying elements to be added to the base steel to form a highly alloyed grade of steel;
　combining and melting the base steel and alloying elements; and
　casting the molten mixture of base steel and alloying elements to form the first clutch component; and wherein:
the first clutch component comprises a plurality of lugs which project from a surface of the first clutch component and engage the second clutch component; and
the process of casting the molten mixture of base steel and alloying elements to form the first clutch component further comprises casting the molten mixture of base steel and alloying elements in a near-net-shape investment casting process whereby no further machining of the plurality of lugs is performed.

31. The screw gun according to claim 30 wherein the process further comprises:
　forming a radius of between 0.020 and 0.040 inches on at least one edge of at least one wear surface on each of the plurality of lugs; and
　case hardening the first clutch component after the radius is formed.

32. A screw gun comprising:
a rotary motor;
an output spindle adapted to drive a threaded fastener, the output spindle being driven by the rotary motor wherein the driving of the output spindle by the rotary motor ceases through disengagement of a clutch when the fastener is driven to a predetermined depth;
a first clutch component that engages with a second clutch component to transfer torque from the rotary motor to the output spindle, the first clutch component comprising a plurality of lugs which project from a surface of the first clutch component and engage the second clutch component; and
the first clutch component is made from a process comprising:
　forming a radius of between 0.010 and 0.060 inches on at least one edge of at least one wear surface on each of the plurality of lugs; and case hardening the first clutch component after the radius is formed.

33. The screw gun according to claim 32 wherein the radius is between 0.015 and 0.045 inches.

34. The screw gun according to claim 33 wherein the radius is between 0.025 and 0.035 inches.

35. The screw gun according to claim 32 wherein:

the first clutch component is made from a highly alloyed steel;

the process further comprises casting the highly alloyed steel in a near-net-shape investment casting process to form the first clutch component whereby no further machining of the plurality of lugs is performed.

36. The screw gun according to claim 32 wherein the process further comprises:

providing a quantity of previously manufactured base steel;

providing a quantity of alloying elements to be added to the base steel to form a highly alloyed steel;

combining and melting the base steel and alloying elements; and casting the molten mixture of base steel and alloying elements to form the first clutch component.

37. The screw gun according to claim 36 wherein:

the first clutch component comprises a plurality of lugs which project from a surface of the first clutch component and engage the second clutch component; and the process of casting the molten mixture of base steel and alloying elements to form the first clutch component further comprises casting the molten mixture of base steel and alloying elements in a near-net-shape investment casting process to form the first clutch component whereby no further machining of the plurality of lugs is performed.

* * * * *